United States Patent [19]

Ziemba

[11] Patent Number: 4,938,122
[45] Date of Patent: Jul. 3, 1990

[54] IMPROVED OUTLET ASSEMBLY
[75] Inventor: Vale M. Ziemba, Livonia, Mich.
[73] Assignee: Chrysler Corporation, Highland Park, Mich.
[21] Appl. No.: 445,527
[22] Filed: Dec. 4, 1989
[51] Int. Cl.$^5$ .............................................. B60H 1/34
[52] U.S. Cl. ........................................ 98/2; 98/40.01; 98/40.18
[58] Field of Search ...................... 98/2, 40.01, 40.18, 98/40.28

[56] References Cited

U.S. PATENT DOCUMENTS

| | | | |
|---|---|---|---|
| 1,961,612 | 6/1934 | Knight | 98/40.18 X |
| 2,514,772 | 7/1950 | Kramer | 98/2.16 |
| 3,264,971 | 8/1966 | Danganthier | 98/2 |
| 3,443,507 | 5/1969 | Runnings | 98/2.16 |
| 3,760,707 | 9/1973 | Kelly | 98/2.18 |
| 3,763,760 | 10/1973 | Erickson | 98/2 |
| 3,839,950 | 10/1974 | Kelly et al. | 98/2.16 |
| 3,861,281 | 1/1975 | Godwin | 98/2 |
| 4,117,772 | 10/1978 | Specht | 98/2 |
| 4,750,410 | 6/1988 | Parker | 98/2 |

FOREIGN PATENT DOCUMENTS

| | | | |
|---|---|---|---|
| 250749 | 1/1988 | European Pat. Off. | 98/40.18 |
| 2459511 | 1/1981 | France . | |
| 667418 | 2/1952 | United Kingdom | 98/2 |

Primary Examiner—Harold Joyce
Attorney, Agent, or Firm—Kenneth H. MacLean, Jr.

[57] ABSTRACT

An improved air directing outlet assembly particularly for an automobile air conditioning system including open front ended and rear ended frame and barrel members. The frame surrounds the barrel which is supported thereby for pivotal movements as guided by engagement of several pins in corresponding elongated apertures.

8 Claims, 2 Drawing Sheets

IMPROVED OUTLET ASSEMBLY

BACKGROUND OF THE INVENTION

1. Field of Invention

This application describes a simple and compact yet versatile air outlet for an automobile air conditioning system.

2. Description of the Related Art

Automobile air conditioning systems in particular have long required an air directing outlet assembly so that a cooled air flow can be conveniently directed to straight out from the outlet or to the right or the left as desired. However, many outlet assemblies to date are complex and thus, costly. In addition, a complex device is much more likely to jam or fail in some other manner.

The U.S. Pat. No. 3,760,707 to Kelly discloses a hingeless two-way ventilator inlet/outlet which allows a pivotal adjustment of a closure member relative to a vehicle's outer surface. The device utilizes a sliding pin acting in a tract.

The U.S. Pat. No. 2,514,772 to Krammer discloses a hingeless ventilator mechanism using a two slot sliding mechanism to move a closure member away from and obliquely to an opening in a vehicle's outer surface.

The U.S. Pat. No. 3,443,507 to Runnings discloses a pivotal wall vent device using a slotted cam plate an a two slotted cam guideway to move a closure member away from and obliquely to an opening.

U.S. Pat. Nos. 3,763,760; 3,839,950; 4,117,772 and French Patent No. 2,459,511 (1981) disclose ventilator actuation mechanisms using slotted brackets and pivotable pins to displace a closure member or the like.

SUMMARY OF THE INVENTION

The subject improved air directing outlet assembly for a vehicle is both simple and versatile. It comprises only two main parts: a frame member with open front and rear sides; and a barrel member also with open front and rear sides. The barrel is supported in the frame and permitted to pivot from the normal mid-position alternately to the right or to the left by means of a combination of pin and slot formations in adjacent end portions of the frame and barrel. The pin and slot arrangement desirably moves an edge portion of the barrel outwardly from the surrounding vehicle dashboard so that air is more efficiently directed laterally. Also, cam means are provided to hold the barrel in its various mid-position, right position and left position so that vibrations alone will not shift the barrel.

DETAILED DESCRIPTION OF AN EMBODIMENT

Figure 1:
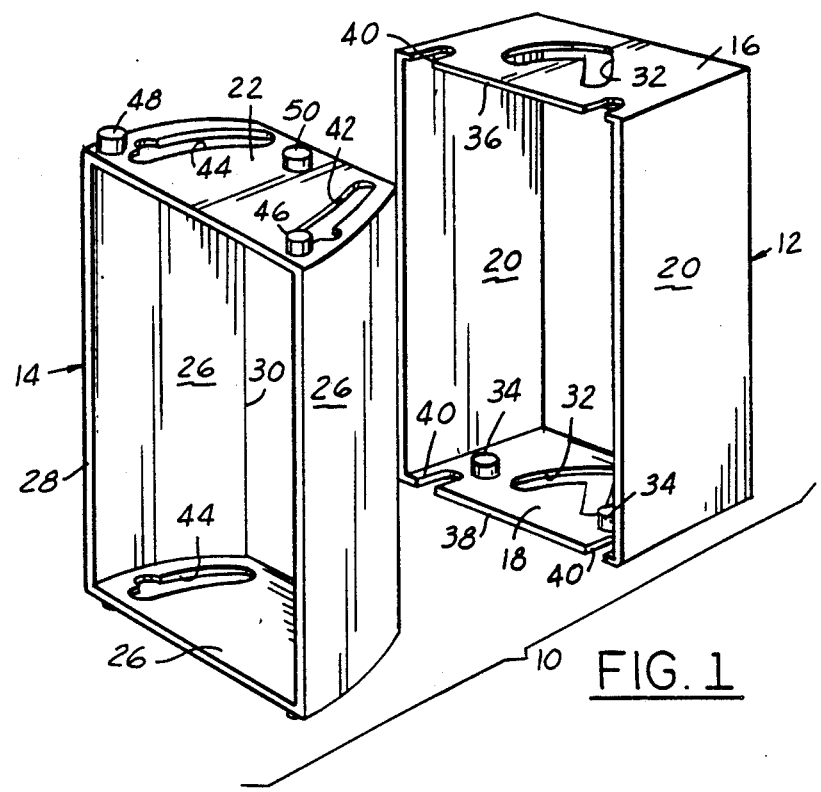
FIG. 1 is a perspective view of the air conditioning outlet showing the two parts separated one from another.

In FIG. 1, a two part air outlet assembly 10 for an automobile air conditioning system is shown. The assembly 10 basically consists of a frame or case member 12 and an air directing or barrel member 14. The frame 12 is a generally rectangularly shaped member formed by a top wall 16, a bottom wall 18 and two side walls 20. The front and rear faces of the frame are open so as to allow air flow therethrough.

Figure 2:
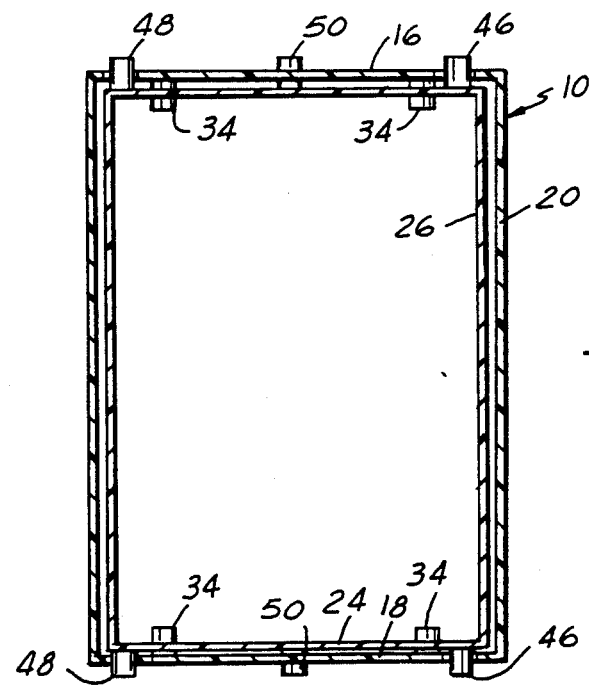
FIG. 2 is a sectioned front view of an assembled outlet.

The barrel member 14 is similar to frame 12 and has a top wall 22, a bottom wall 24 and curved side walls 26. Like the frame 12, the front and rear faces are open to allow air flow therethrough. The barrel is slightly non-rectangular in that the front face as encircled by edge 28 is wider than the rear face as encircled by an opposite edge 30. The dimensions of the frame 12 are larger than the dimensions of the barrel 14 as shown in FIG. 2. This permits the barrel 14 to be housed and supported in the frame member 12.

Figure 5:
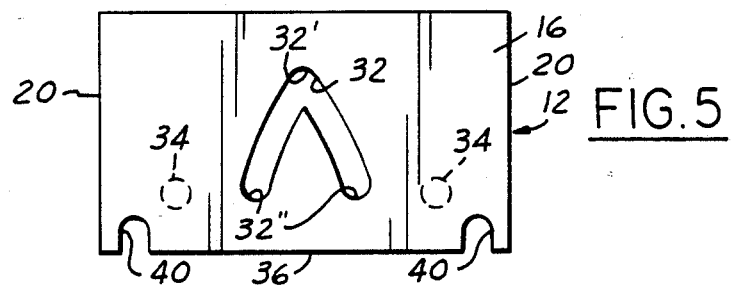
FIG. 5 is a top planar view of the stationary outer part of the outlet.

The top and bottom walls 16 and 18 of the frame 12 are the same and will also be referred to as the ends. As shown in FIGS. 1 and 5, both ends 16, 18 have a generally V-shaped slot 32 formed therethrough. The slot 32 is formed by two intersecting arcuate and elongated apertures. Each of the V-shaped slots 32 in the ends are aligned with one another. As best shown in FIG. 2, each of the frame ends 16, 18 also have a pair of spaced pins 34 which extend inward from the top and bottom ends 16 and 18. In addition, the forward edges 36 and 38 of the top and bottom ends 16, 18 have a pair of spaced open recesses 40 inset therein.

Figure 4:
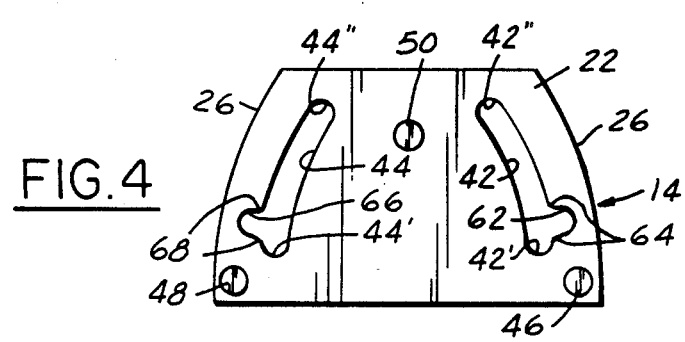
FIG. 4 is a top planar view of the movable inner part of the outlet.

The top and bottom walls 22 and 24 of the barrel 14 are the same and will be referred to as the ends. As shown in FIGS. 1 and 4, both of the barrel ends have a pair of spaced non-intersecting arcuate and elongated apertures 42 and 44 therethrough. Each pair of apertures in both of the barrel ends 22 and 24 are aligned with one another. In addition, three spaced pins 46, 48 and 50 extend outward from the ends 22 and 24 of the barrel 14.

Figure 3:
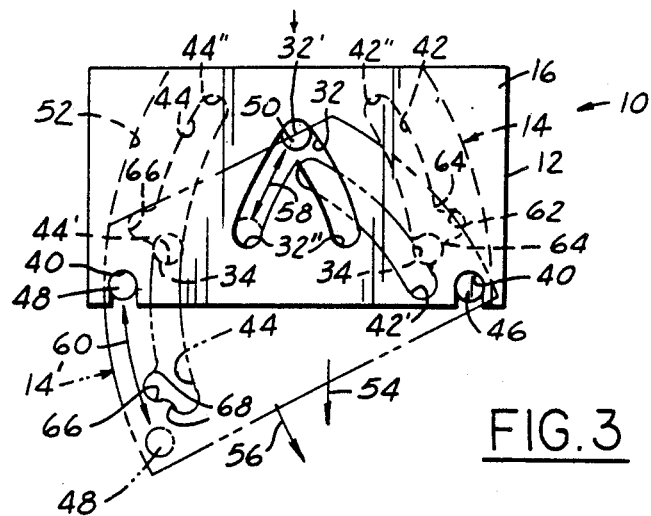
FIG. 3 is a top planar elevational view of the outlet in a alternate positions.

As is clear from an examination of FIGS. 2 and 3, the pins 50 which extend outward from the opposite ends of the barrel 14 pass through adjacent V-shaped slots 32 in the associated frame ends 16 and 18. Likewise, the spaced pins 34 which extend inward from the ends of the frame 12 pass through the slots 42, 44 in the barrel ends.

The barrel 14 is adapted to pivot between alternate positions as is shown in FIG. 3. When a forward flow of air is desired, the barrel 14 is in a mid-position as shown by the hidden outline 52 in FIG. 3. In this position, the pin 50 is located at the intersection 32' of the apertures forming the V-shaped slot 32. The pins 34 are positioned at the forward end 42' and 44' of the apertures 42 and 44 respectively. The spaced pins 46 and 48 which are located near the forward edge of the barrel 14 are received in the recesses 40 of the frame 12. In this mid-position, air flows from the back or rearward part of the frame 12 (the top in FIG. 3) and is received into the open rear face of barrel 14. The air then flows outward from the front (bottom in FIG. 3) as indicated by the arrow 54.

If a rightward or a leftward flow of air is desired, the barrel 14 may be pivoted from the mid-position either counterclockwise or clockwise, respectively. In FIG. 3, the barrel 14 is shown in its normal mid-position as illustrated by hidden outline 52. To direct air flow to the right, the barrel 14 is pivoted counterclockwise to the dashed phantom line position 14'. In this position 14', the assembly 10 delivers air to the right as indicated by arrow 56.

As barrel 14 is pivoted to position 14', the central pin 50 on each end of the barrel 14 slides from the mid-position 32' of V-shaped slot 32 in frame 12 toward a forward end portion 32" of the aperture. In FIG. 3, the arrowed line 58 shows this movement. This shifts the barrel 14 outward and orients it counterclockwise. Simultaneously, the rightward aperture 42 of barrel 14 moves along rightward pin 34 of frame 12 toward the end portion 42'. Also, the leftward aperture 44 of barrel 14 moves along the leftward pin 34 of frame 12 toward the end portion 44". Thus the relative position of the leftward pin 34 changes from forward end 44' of aperture 44 to rearward end 44". The above described pivoting of barrel 14 takes place about the axis of side pin 46 in the recess 40 as shown in FIG. 3. The opposite side pin 48 moves along with barrel 14 as indicated by arrowed line 60.

Alternately, when barrel 14 is pivoted clockwise to deliver an air flow to the left in FIG. 3 (not illustrated), pivot of barrel 14 takes place about the axis of leftward pin 48 in the leftward recess 40. Also, pin 50 slides from rearward position 32' along the rightward aperture of the slot 32 to the right forward end portion 32". Simultaneously, the leftward pin 34 shifts to the end portion 44' and the rightward pin 34 shifts toward end portion 42". Rightward pin 46 moves forward with the barrel 14 away from the rightward recess 40.

There is a need to describe one further refinement. When the barrel 14 is in the mid-position as shown by the hidden outline in FIG. 3, side pins 34 on both ends of frame 12 reside within laterally enlarged pockets of the apertures 42 and 44. Specifically, a rightward enlargement or pocket 62 is shown in FIG. 4 adjacent the end portion 42'. Rounded shoulders or edge portions 64 are formed to either side of the pocket 62. Likewise, a leftward enlargement or pocket 66 is shown adjacent the end portion 44'. A rounded shoulder or edge portion 68 is formed to either side of the pocket 66. When the barrel 14 is in its mid-position, the spaced pins 34 reside in the laterally enlarged pockets 62 and 66. This secures barrel 14 in the mid-position to prevent vibrations from shifting the barrel either clockwise or counterclockwise. When pivoting of the barrel 14 is desired as shown in FIG. 3, the pins 34 are moved past the shoulders 64 and 68. This sliding movement across the shoulders or edges requires a positive pivoting force.

The embodiment which has been described and illustrated in the drawings has been simplified as much as possible so that the essential features of the mechanism are emphasized. However, it should be clear that in outlets of this type, it is common to provide one or more vanes extending across to open front face of the barrel so as to more effectively direct air flow. Therefore, it is contemplated that the subject assembly might include one or more vanes extending vertically in FIGS. 1 and 2 between the ends 22 and 24 of the barrel member 14.

Although only a single embodiment of the air outlet assembly has been illustrated and described in detail, it should be clear that modifications may be made without falling outside the scope of the invention as claimed hereafter.

I claim:

1. An improved air directing outlet assembly for a vehicle air conditioner adapted to be located within an opening in a vehicle dashboard panel for selectively directing air flow straight out from the front of the outlet assembly or to either side, the improved assembly comprising: a generally rectangularly shaped frame member having side walls, opposite end walls and open front and rear faces so that air can flow into the rear face and discharge from the front face of the assembly; a barrel member with opposite end walls, opposite side walls and open front and rear faces so that air can pass through the assembly, the barrel member being configured and sized to fit within the walls of the frame, its opposite end walls extending in close overlying relation to the frame's end walls, the side walls of the barrel member being curved slightly inward toward one another from the front face to the rear face sufficiently to prevent interference as the barrel is rotated in the frame; a central pin and slot arrangement between the overlying end walls of the frame and the barrel, the slot having a substantially V-shaped configuration formed by intersecting apertures which diverging from their intersection in a direction toward the front face of the assembly, the pin positioned at the intersection of the V-shaped slot when the barrel is in a normal mid-position; a pivot pin and edge recess arrangement between each of the overlying end walls of the frame and barrel consisting of a pair of spaced pins extending outward from the end wall of the barrel and corresponding recesses formed in the forward edge of the frame's end wall so that when in the normal mid-position, the pair of pivot pins are received in the recesses whereby when the barrel member is pivoted either right or left, one of the pivot pins moves outward away from its corresponding recess while the barrel pivots about the other pivot pin in its corresponding recess while the central pin moves in the V-shaped slot away from the intersection of the apertures so that rotation of the barrel includes substantial but limited movement of one side edge outward from the instrument panel.

2. The improved air outlet assembly set forth in claim 1 in which a pair of pin and slot arrangements in addition to the central pin and V-shaped slot arrangement are formed between the overlying ends of the frame and barrel members, comprising a pair of circular slot forming apertures each extending about a center coincident with a different one of the pivot pins most remote therefrom the circular slot.

3. The improved air outlet assembly set forth in claim 2 in which the apertures forming the circular slots each have enlarged pocket portions extending slightly laterally outward so that a corresponding pin in the slot moves therein to yieldably secure the barrel in one position.

4. The improved air outlet assembly set forth in claim 3 in which a shoulder means is formed to either side of the enlarged pocket so that passage of the pin thereby requires a significant force on the barrel.

5. In a vehicle having a dashboard panel with an opening therein and means to deliver a flow of air to the opening for subsequent delivery into a passenger compartment, an improved air directing outlet assembly adapted to be located within the panel opening for selectively directing a flow either straight out from the front of the outlet assembly or to either side, the improved assembly comprising: a generally rectangularly shaped frame member having side walls, opposite end walls and open front and rear faces so that air can flow through the rear face and be discharged from the front face of the assembly; a barrel member with opposite end walls, opposite side walls and open front and rear faces so that air can pass through the outlet assembly, the barrel member being configured and sized to fit within the walls of the frame, its opposite end walls extending in close overlying relation to the frame's end walls, the side walls of the barrel member being curved slightly inward toward one another from the front face to the rear face sufficiently to prevent interference as the barrel is rotated in the frame; a central pin and slot arrangement between the overlying end walls of the frame and the barrel, the slot having a substantially V-shaped configuration formed by intersecting apertures which diverging from their intersection in a direction toward the front face of the assembly, the pin positioned at the intersection of the V-shaped slot when the barrel is in a normal mid-position; a pivot pin and edge recess arrangement between each of the overlying end walls of the frame and barrel consisting of a pair of spaced pins extending outward from the end wall of the barrel and corresponding recesses formed in the forward edge of the frame's end wall so that when in the normal mid-position, the pair of pivot pins are received in the recesses whereby when the barrel member is pivoted either right or left, one of the pivot pins moves outward away from its corresponding recess while the barrel pivots about the other pivot pin in its corresponding recess while the central pin moves in the V-shaped slot away from the intersection of the apertures so that rotation of the barrel includes substantial but limited movement of one side edge outward from the instrument panel.

6. The improved air outlet assembly set forth in claim 5 in which a pair of pin and slot arrangements in addition to the central pin and V-shaped slot arrangement are formed between the overlying ends of the frame and barrel members, comprising a pair of circular slot forming apertures each extending about a center coincident with a different one of the pivot pins most remote therefrom the circular slot.

7. The improved air outlet assembly set forth in claim 6 in which the apertures forming the circular slots each have enlarged pocket portions extending slightly laterally outward so that a corresponding pin in the slot moves therein to yieldably secure the barrel in one position.

8. The improved air outlet assembly set forth in claim 7 in which a shoulder means is formed to either side of the enlarged pocket so that passage of the pin thereby requires a significant force on the barrel.

* * * * *